United States Patent [19]

Togashi

[11] Patent Number: 5,198,917
[45] Date of Patent: Mar. 30, 1993

[54] METHOD OF ALIGNING LIQUID CRYSTAL MOLECULES IN AN ACTIVE MATRIX LIQUID CRYSTAL DISPLAY ELEMENT BY TWO ALIGNMENT TREATMENTS

[75] Inventor: Seigo Togashi, Tokorozawa, Japan
[73] Assignee: Citizen Watch Co., Ltd., Tokyo, Japan
[21] Appl. No.: 613,709
[22] PCT Filed: Apr. 4, 1990
[86] PCT No.: PCT/JP90/00457
   § 371 Date: Dec. 4, 1990
   § 102(e) Date: Dec. 4, 1990
[87] PCT Pub. No.: WO90/12340
   PCT Pub. Date: Oct. 18, 1990

[30] Foreign Application Priority Data

Apr. 7, 1989 [JP] Japan .................... 1-88920

[51] Int. Cl.⁵ ........................... G02F 1/1337
[52] U.S. Cl. ........................... 359/76; 359/75
[58] Field of Search ............ 350/339 R, 340, 341; 359/75, 76

[56] References Cited

U.S. PATENT DOCUMENTS 4,796,979  1/1989  Tsuboyama ............... 350/340
4,836,653  6/1989  Yoshino et al. .......... 350/341

FOREIGN PATENT DOCUMENTS 0056822    4/1982  Japan .................... 350/341
60-241021  11/1985  Japan .
62-116921  5/1987  Japan .
0038917    2/1988  Japan .................... 350/334

OTHER PUBLICATIONS

Buczek, "A Thin Film Process to Improve Off Axis Viewing of Liquid Crystal Displays," Mol. Cryst. Liq. Cryst., vol. 47, No. 3-4, (1978), pp. 145-154.

Primary Examiner—Janice A. Howell
Assistant Examiner—Anita Pellman Gross

[57] ABSTRACT

A method of aligning liquid crystal molecules in an active matrix liquid crystal display element having an active substrate (1) provided with a switching element in each pixel for driving a picture element in the pixel, an opposite substrate (2) provided opposite to the active substrate is disclosed. Aligning molecules at the side of the active substrate is performed in a supplementary alignment direction (22) and in a main alignment direction (23). Aligning molecules at the side of the opposite substrate is performed in a direction different from that of the main alignment direction, thereby reducing an influence of a shadow of a projection on the active substrate.

3 Claims, 7 Drawing Sheets

PRIOR VISUAL FIELD

METHOD OF ALIGNING LIQUID CRYSTAL MOLECULES IN AN ACTIVE MATRIX LIQUID CRYSTAL DISPLAY ELEMENT BY TWO ALIGNMENT TREATMENTS

TECHNICAL FIELD

The present invention relates to a method of aligning liquid crystal molecules in an active matrix liquid crystal display element.

The liquid crystal display element is widely used as a flat panel display having a low electric consumption. In particular, a liquid crystal display of an active matrix type, in which a switching element such as a thin film transistor (TFT) or a thin film diode is provided in each pixel for driving the molecules in the pixel, has a large capacity and high quality, so that it is used for a television set and an information terminal equipment. In manufacturing process of the liquid crystal display element, it is very important to align the molecules for controlling the orientation of the liquid crystal molecules. However, in the active matrix display, since the switching elements are projected on a substrate, the surface of the substrate is uneven. Therefore, it is difficult to obtain preferable alignment.

FIGS. 2 and 3 show a pixel of a conventional active matrix liquid crystal display element having a TFT switch. FIG. 2 is a sectional view and FIG. 3 is a plan view of a substrate having a switching element. The display element comprises a substrate 1 having a switching element (hereinafter called an active substrate), a substrate 2 without a switching element (hereinafter called an opposite substrate), a liquid crystal layer 3 sealed between the substrates 1 and 2. On the active substrate 1, a TFT type switching element 10 for driving liquid crystal molecules 6, a data electrode 11, a scanning electrode 12, and a display electrode 13 are provided. On the opposite substrate 2, an opposite electrode 14 is provided. Further, on both substrates, alignment films 7 and 8 made of polyimide are formed respectively, for controlling initial alignment of the molecules.

FIGS. 4 and 5 show another conventional liquid crystal display element having a diode ring (DR) as a switching element. FIG. 4 is a sectional view and FIG. 5 is a plan view of an active substrate. The liquid crystal layer 3 is sealed between the active substrate 1 and the opposite substrate 2. On the active substrate 1, a DR type switching element 15 for driving liquid crystal molecules 6, a scanning electrode 16, and the display electrode 13 are provided. On the opposite substrate 2, a data electrode 17 is provided. Further, on both substrates, alignment films 7 and 8 are formed respectively, for controlling initial alignment of the molecules. The data electrode 17 is provided opposite to the display electrode 13 and disposed in the direction to cross the scanning electrode 16.

As aligning treatment applied on the alignment films 7 and 8 of the active matrix display element, there are some methods such as a rubbing process and a vacuum deposition method. The rubbing process is usually used. In the rubbing process, the surface of the alignment film is rubbed with a brush in one direction so that the molecules are lined up in the rubbing direction.

A twist angle between the substrates and a preferential viewing direction of the liquid crystal layer 3 are determined by the alignment direction. The preferential viewing direction is a visual direction from which an image having the highest contrast can be observed. For example, in order to form a preferential viewing field in front of the liquid crystal display of 90° TN (twisted nematic) mode, it is necessary to align in the direction at an angle of 45 degrees with the edge of the substrate as shown in FIG. 6. In FIG. 6, an arrow 31 represents a rubbing direction for an upper substrate and an arrow 32 is a rubbing direction for a lower substrate.

In the active matrix display element, the uneven surface of the active substrate caused by projections of the switching elements formed thereon makes it difficult to align the molecules. As shown in FIGS. 2 and 4, the switching elements and the electrodes are considerably thick, for example about 0.8 to $2.5\mu$ in thickness. Since shadow portions of the switching elements and the electrodes are not rubbed, the initial directions of the molecules are not controlled, and hence the bad alignment is not corrected. Such a disadvantage can not be eliminated even if the method changes. If an oblique vacuum deposition method is used in place of the rubbing process, bad alignment may be produced at the shadow portions.

If shadows are formed on portions other than the display electrodes, the shadows can be hidden by black matrixes.

However, if the shadows are formed on the display electrode, practical problems such as deteriorations of the performance of the display arise.

From this point of view, it is advantageous that the orientation is performed in the same direction as the arrangement of the matrix. Referring to FIG. 7 showing a display element having diode rings, if an alignment direction 36 is parallel with the direction of arrangement of the matrix, namely the direction of scanning electrodes 16, a shadow 35 of each pixel is formed on or along a wiring. Thus, it is possible to hide the shadow by a black matrix.

To the contrary, as shown in FIG. 8, if an alignment direction 37 is oblique with respect to the scanning electrodes 16, the shadow 35 overlaps with a part of the display electrodes 13. Thus, the display performance reduces. However, if a visual direction characteristic is considered as described above with reference to FIG. 6, it is necessary to provide the oblique alignment as shown in FIG. 8. If the preferential viewing direction is provided in front of the display element as shown in FIG. 6, the alignment direction does not coincide with the arrangement of the matrix.

In order to manufacture the liquid crystal display element under such conditions where the bad alignment is liable to occur as hereinbefore described, the problems have been solved by increasing the number, pressure and speed of the rubbing. However, if the conditions of the rubbing are increased, the switching element and the alignment film are harmed and damage caused by static electricity will occur. Thus, the practical range of condition for the manufacturing of the display is very small, and hence if the condition slightly changes, the yield is reduced. Further, if the height of the uneven surface of the substrate is $2\mu$ or more, bad alignment increases, causing reduction of the yield.

An object of the present invention is to provide a method of aligning molecules in an active matrix liquid crystal display in which the molecules are stably lined up in spite of the uneven surface of the display element.

Another object of the present invention is to provide a method which can be stably performed to align molecules of the display element even if the alignment direction of the molecules does not coincide with the arrangement of the matrix, thereby giving high quality and reliability to the display at high yield.

DISCLOSURE OF THE INVENTION

According to the present invention, there is provided a method of aligning liquid crystal molecules in an active matrix liquid crystal display element having an active substrate provided with a switching element in each pixel for driving a picture element in the pixel, an opposite substrate provided opposite to the active substrate, and a liquid crystal layer having molecules sealed between both the substrates comprising the steps of aligning molecules at the active substrate by main alignment in a main alignment direction and supplementary alignment in a supplementary alignment direction which is determined so as to reduce remaining portions which are not treated by the main alignment, caused by an uneven surface of the active substrate; and aligning molecules at the opposite substrate at least in one direction which is different from that of the main alignment direction.

By combining the aligning in the main alignment direction at the active substrate with the aligning at the opposite substrate, the twist angle and the preferential viewing direction of the liquid crystal layer are determined, and bad alignment at the shadow portion is eliminated in accordance with the aligning in the supplementary alignment direction at the active substrate.

BEST MODE FOR EMBODYING THE INVENTION

Figure 1:
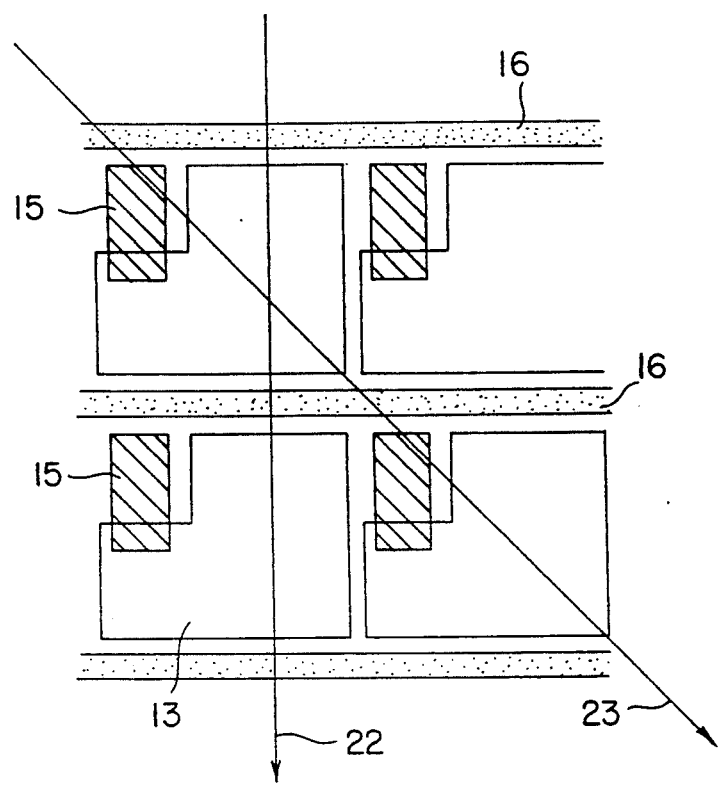
FIG. 1 is a plan view showing alignments of liquid crystal molecules in an active matrix liquid crystal display element according to the present invention.
Figure 2:
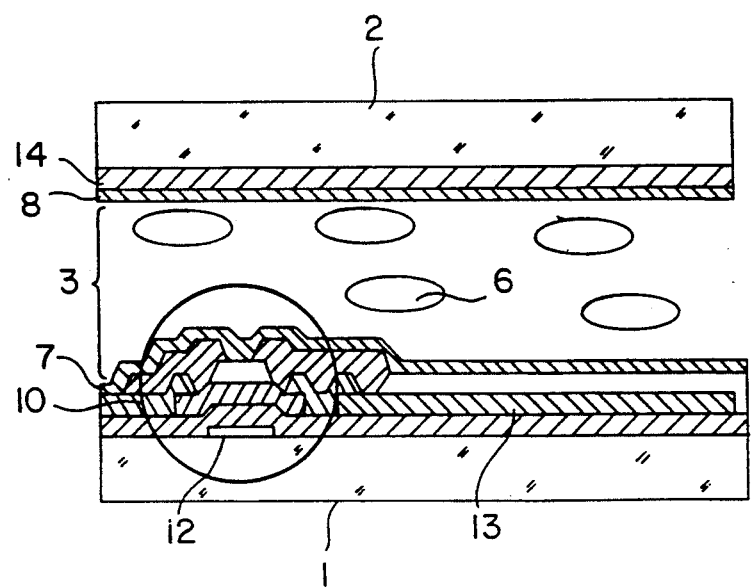
FIG. 2 is a sectional view showing a pixel of a TFT type active matrix liquid crystal display element, taken along a line A—A' of FIG. 3.
Figure 3:
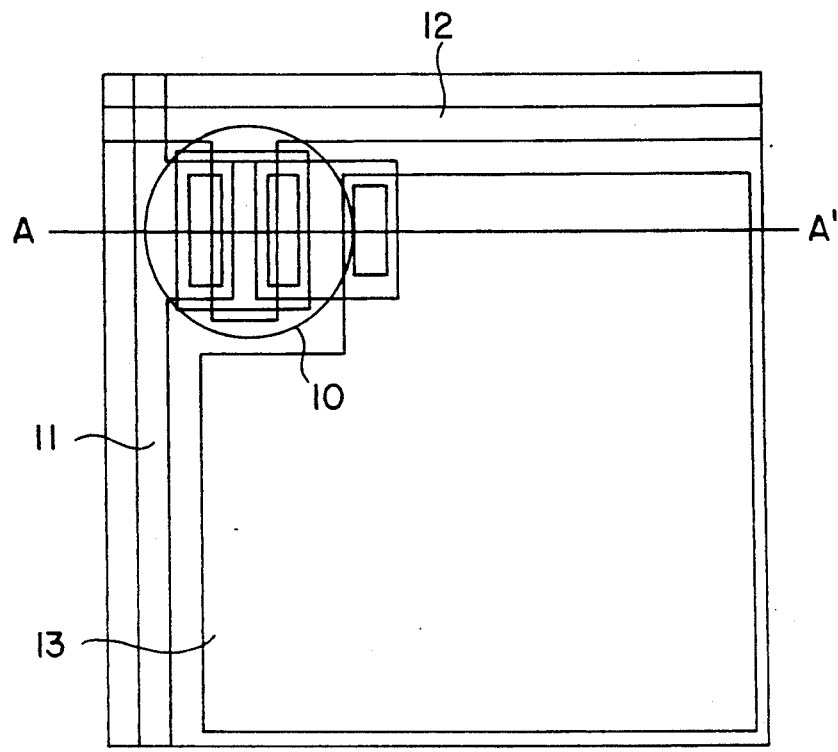
FIG. 3 is a plan view of the pixel of FIG. 2.
Figure 4:
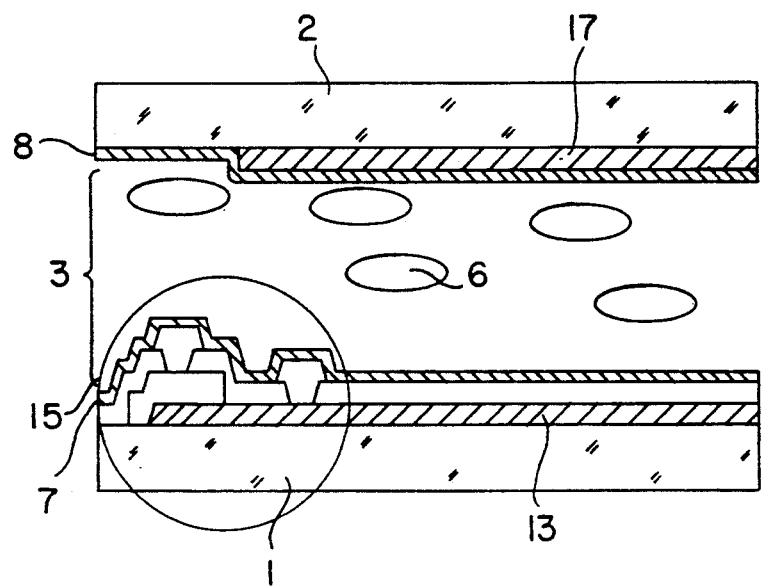
FIG. 4 is a sectional view showing a pixel of a liquid crystal display element having a diode ring, taken along a line B—B' of FIG. 5.
Figure 5:
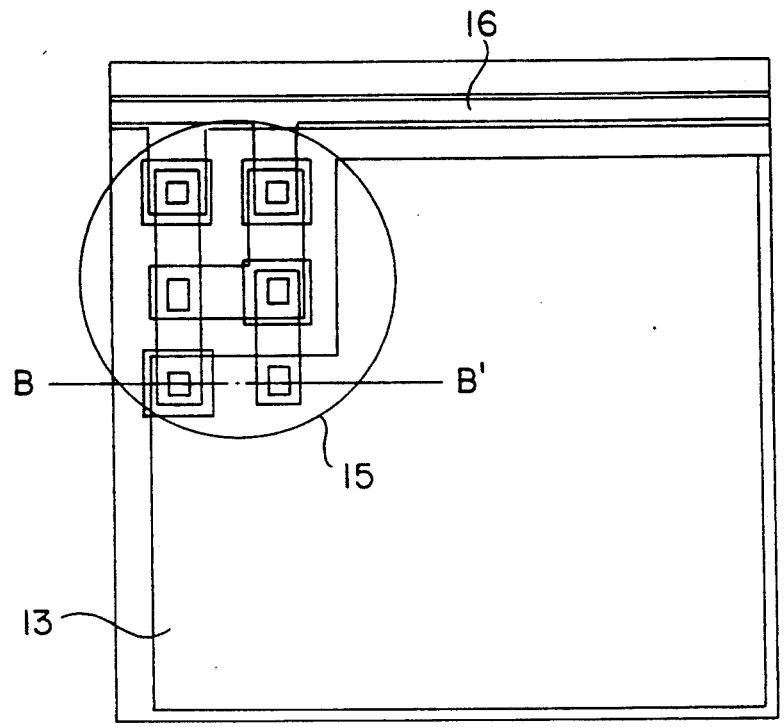
FIG. 5 is a plan view of the pixel of FIG. 4.
Figure 7:
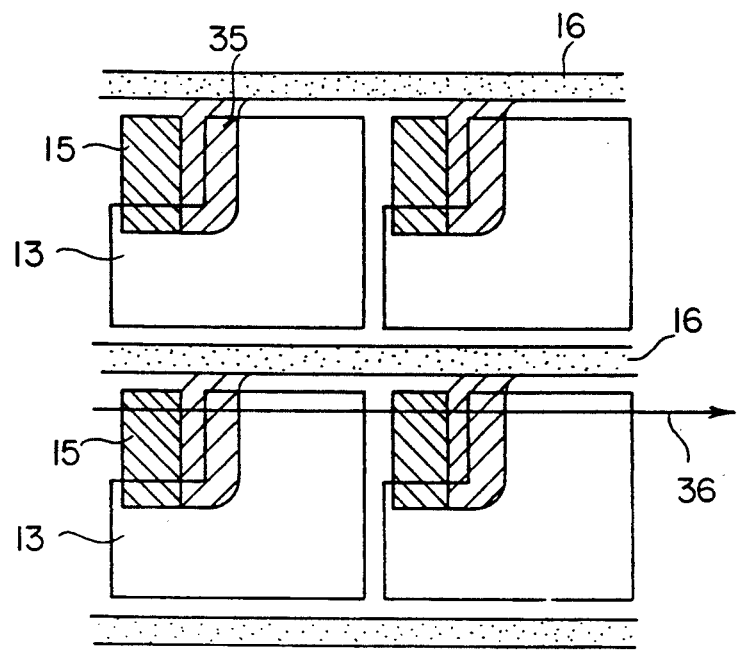
FIGS. 7 and 8 are plan views showing relationship between alignment directions and bad alignments caused by shadows in a conventional display element.
Figure 8:
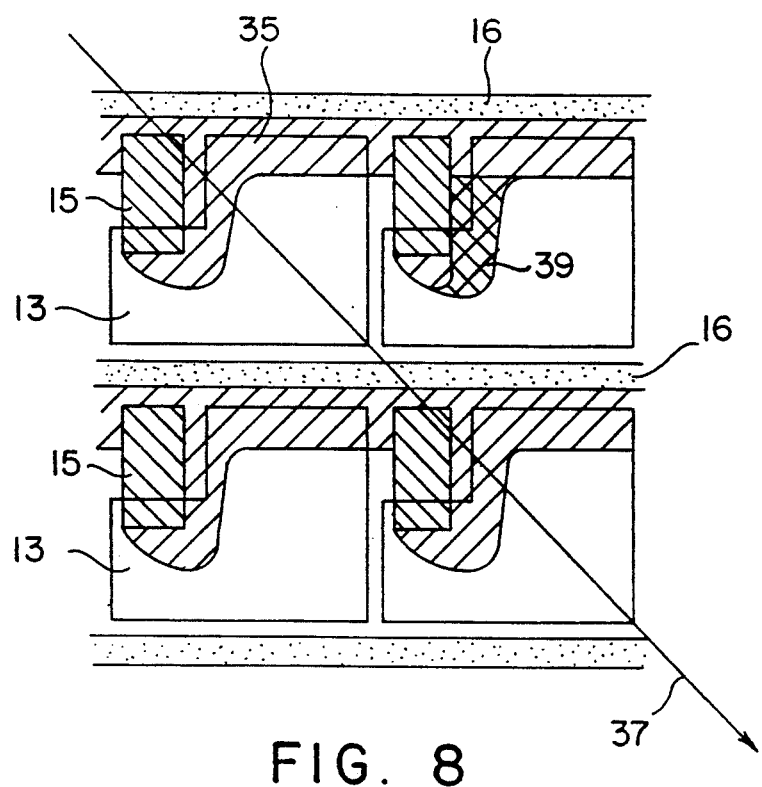

The present invention will be described hereinafter with reference to the drawings. FIG. 1 is a plan view showing alignment directions of liquid crystal molecules in an active matrix liquid crystal display element according to the present invention. The liquid crystal display element of the present invention is employed with the liquid crystal in the 90 degrees TN mode and a diode ring as a switching element. The preferential viewing field is in front of the display element as described in the conventional methods of FIGS. 7 and 8. In the conventional methods of FIGS. 7 and 8, the shadows 35 are formed to cause bad alignment in the pixel.

Figure 6:
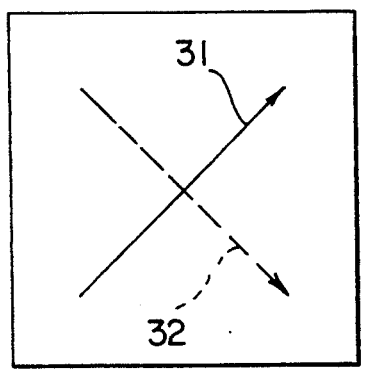
FIG. 6 is an explanatory plan view showing alignment directions when a preferential viewing direction is in front of the display element.
Figure 6:

Describing the method of the present invention, a supplementary rubbing is performed on the alignment film of the active substrate in a supplementary alignment direction 22, and thereafter a main rubbing is performed in a main alignment direction 23 the direction of which is determined by a desired preferential viewing direction. The supplementary rubbing direction 22 is determined to cross the scanning electrodes 16. The alignment treatment on the opposite substrate is performed in the direction perpendicular to the main alignment direction 23, that is the direction 31 shown in FIG. 6.

Figure 9:
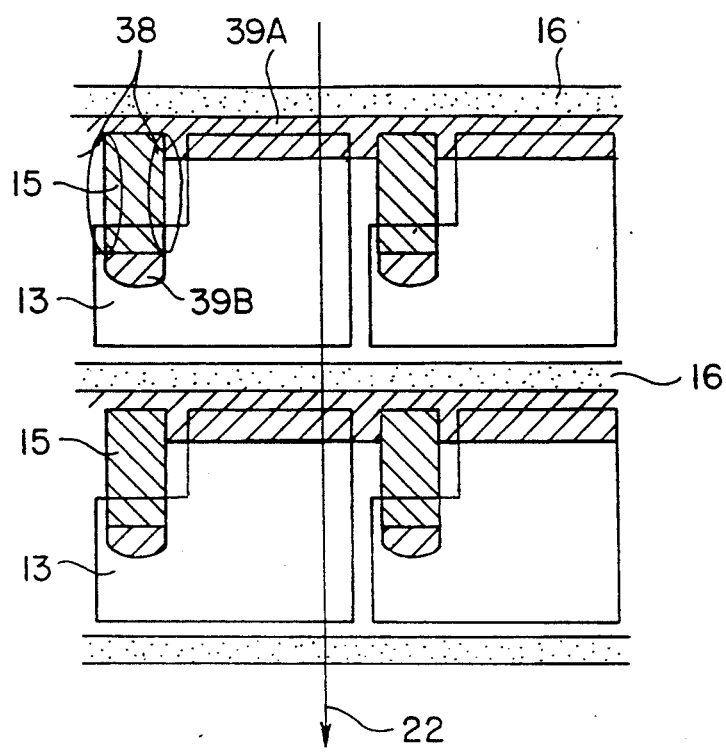
FIG. 9 is a plan view showing the display element of FIG. 1 after a supplementary alignment treatment.

FIG. 9 is a plan view showing the display element of FIG. 1 after the supplementary aligning. As shown in FIG. 9, there are two shadows 39A and 39B in the pixel. In the present invention, the molecules in a shadow 39 shown in FIG. 8, which is to be a shadow at the main rubbing, is aligned by the supplementary aligning in the direction 22. Therefore, the portions which are not aligned are shadows except the shadow 39 in FIG. 8. Thus, a domain is hardly produced compared with the conventional method. Although, side portions 38 of the switching element are liable to form a nucleus of bad alignment called an induced domain, the supplementary aligning prevents an irregular arrangement from occuring.

Figure 10:
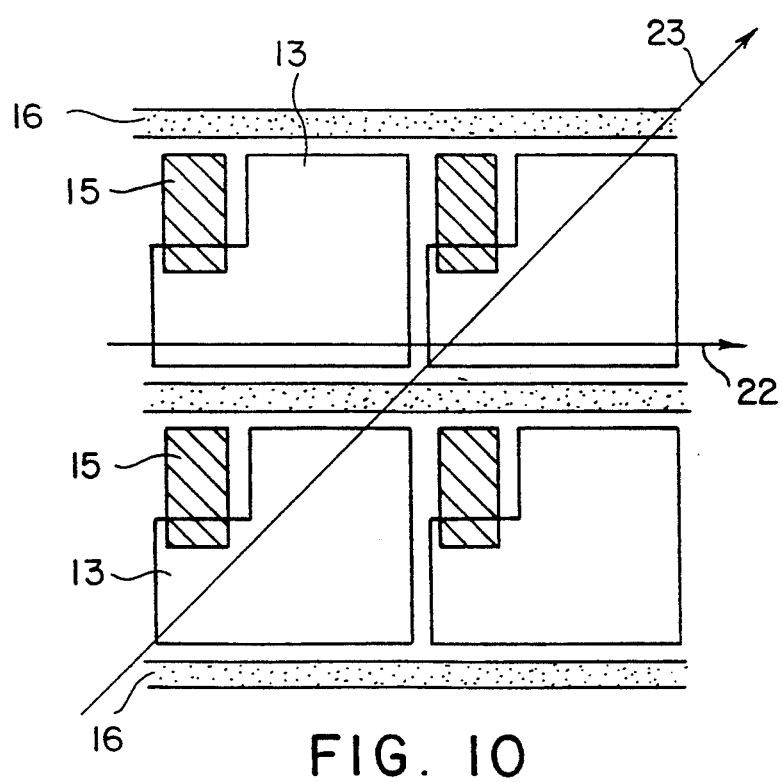
FIGS. 10 and 11 are plan views showing other embodiments of the present invention.

FIG. 10 shows another embodiment of the present invention. The supplementary aligning is performed in the direction 22 parallel with the data electrodes 16 on the active substrate. In addition to the effect of the embodiment of FIG. 1, the sides of the data electrode 16 are aligned by the supplementary aligning so that bad alignment is further prevented.

Figure 11:
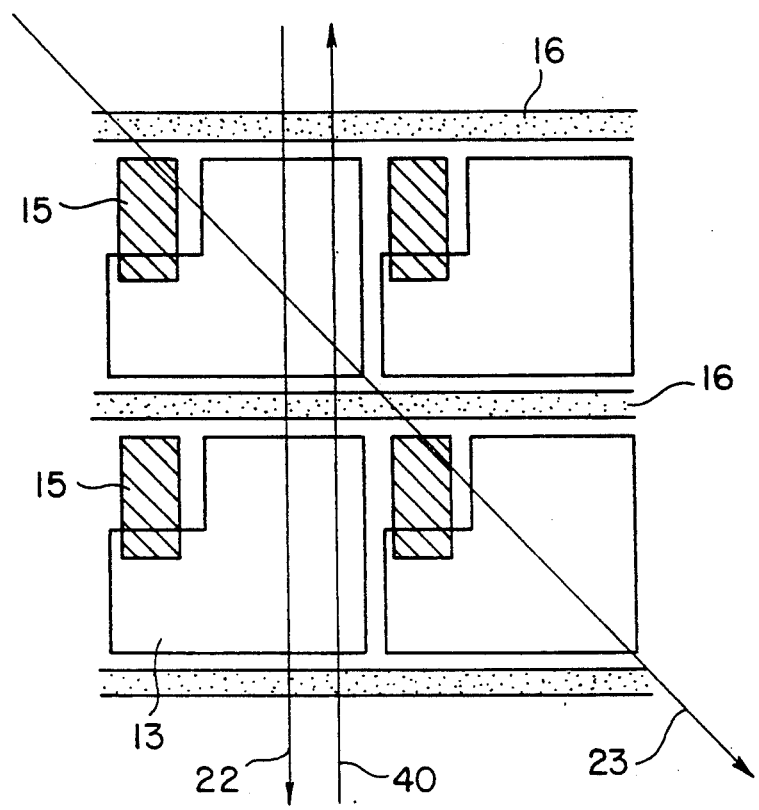

FIG. 11 shows a further embodiment of the present invention. Supplementary alignment is provided besides the alignment direction 22 in the reverse direction 40. In the embodiment of FIG. 1, although the supplementary aligning and the main aligning are performed, unregularized zones are still existed. In this embodiment, a plurality of supplementary alignings are performed in various directions, all of shadow portions are regularized, thereby preventing bad alignment.

The conditions of the present invention described hereinbefore will be summarized as follows.

In order to eliminate the shadows on the display electrodes, it is preferably that the direction of the supplementary alignment for the molecules is parallel with or at a right angle with the electrode (data electrode or scanning electrode). Thus, if the supplementary aligning is performed under such conditions, bad alignment caused by shadows including the sides of the wiring and switching element can be reduced.

The alignment of the molecules is further optimized in accordance with the supplementary alignment as follows.

Figure 12:
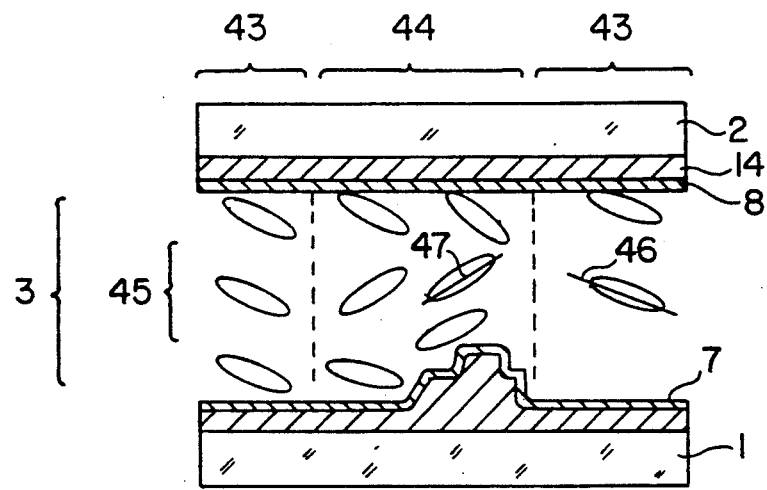
FIG. 12 is a sectional view showing a reverse oblique domain.

The worst alignment is called reverse tilt domain. FIG. 12 shows the reverse tilt domain. In normal tilt zones 43, each molecule in a central portion 45 of the liquid crystal layer 3 is tilted in a normal direction 46 determined by the aligning of the alignment films 7 and 8. However, in a reverse tilt zone 44, each molecule in the central portion is tilted in the reverse direction 47 opposite to the normal direction 46. Such a reverse tilt domain has two types. One of the types is a fixed domain which is produced regardless of an applied driving voltage. The other is an induced domain which is produced by the applied driving voltage. When the reverse tilt domain occurs, the preferential viewing field becomes reverse in the domain, which means a fatal defect of the display. As shown in FIG. 12, the uneven surface of the substrate causes the production of the reverse tilt domain. Furthermore, in the conventional method, since the molecules at the shadow portion are unregularized, the reverse tilt domain is liable to occur.

In the present invention, the alignment direction of the molecules determined by the supplementary alignment is the same as the orientation of the molecules in the central portion of the liquid crystal layer. Consequently, even if the shadows are formed by the main alignment for determining the display performance, the molecules in the shadow portions are lined up to tilt in the normal direction, so that the reverse tilt domain hardly occurs.

Although, in the above described embodiments, the liquid crystal display element in the 90 degrees twisted nematic mode is employed, the twist angles more than 90 degrees or less than 270 degrees may be available.

The present invention is effective to any display element of a TN type. In the TN type display element, the twist angle is determined in accordance with the main alignment of the active substrate and the alignment of the opposite substrate. The direction of the prior visual angle is an angle which is one-half of the twist angle and coincides with the direction of the molecules in the central portion of the liquid crystal layer.

Consequently, if the supplementary aligning is performed on a part, which is subjected to the main alignment, to line up the molecules in the portion in the preferential viewing direction, the reverse tilt can be effectively prevented.

The present invention provides a remarkable effect by using the rubbing process. The same effect is provided by using the tile vacuum deposition of SiO.

PROBABILITY OF INDUSTRIAL EXPLOITATION

Figure 13:
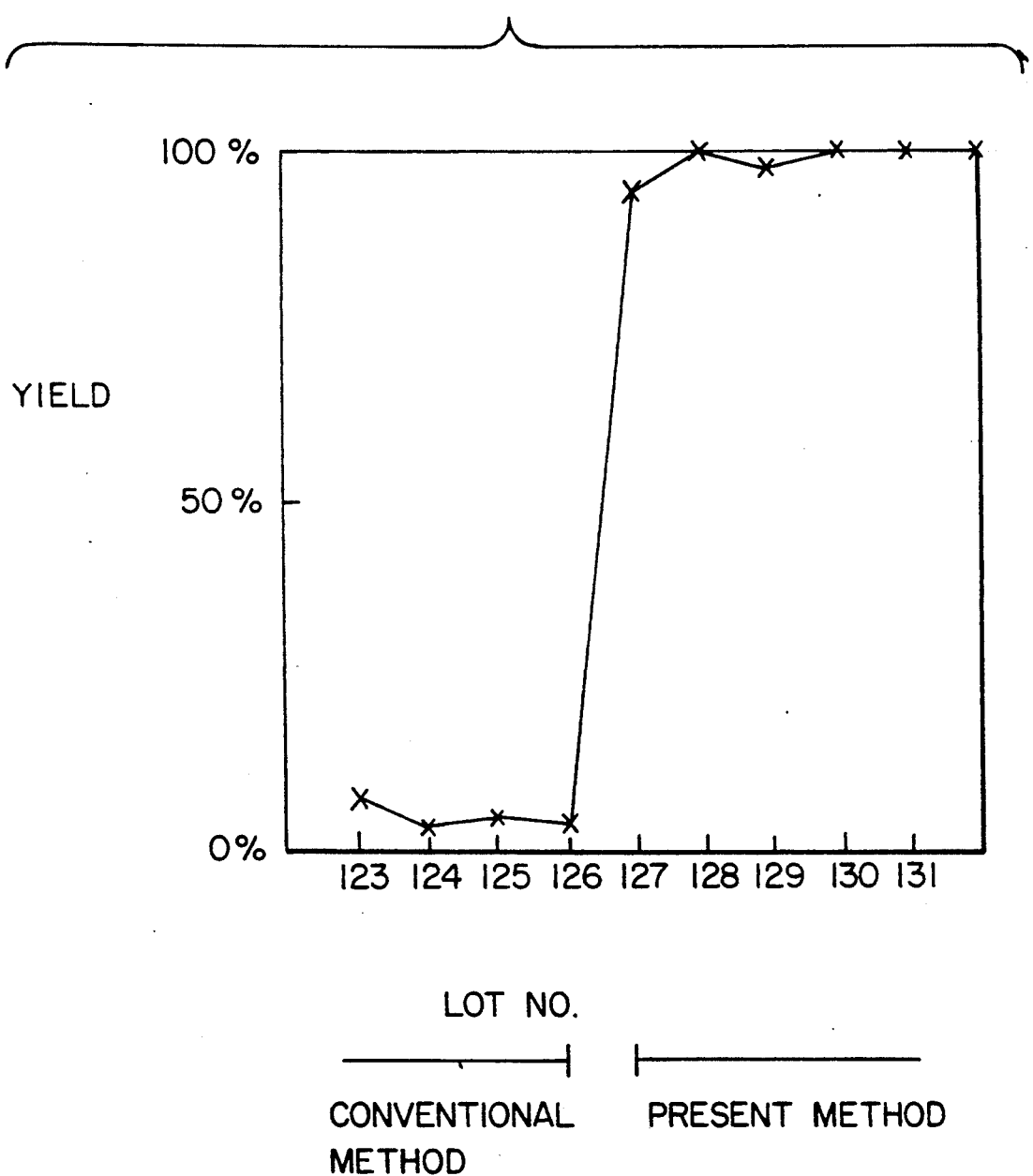
FIG. 13 is a graph showing alignment yields of a conventional method and the method of the present invention.

FIG. 13 is a graph showing yields in the conventional method and the method of the present invention in which before lot No. 126 shows the yield in the conventional method and after lot No. 127 is the yield in the method of the present invention. It will be seen that the yield in the conventional method is very low, and the yield in the present invention remarkably increases.

In accordance with the present invention, it is possible to reduce bad alignment caused by the uneven surface of the substrate.

The liquid crystal display device is used for a large display such as a wall-hanging television set and a terminal equipment of a computer. However, in the large liquid crystal display device, wiring resistance of the matrix wiring causes problem. In order to solve the problem, it is only and a proper way to attach a metallic film of a low resistance and a large thickness to the substrate. Such a thick film causes bad alignment in the conventional technique. The present invention solves the problem as described above.

In the active matrix liquid crystal display element, if a step coverage of a metal film on a step portion of the switching element is insufficient, the switching element is liable to be disconnected, causing a defect of the display element. In order to eliminate the defect, it is necessary to increase the thickness of the wiring. In the conventional method, increase of the thickness is limited on account of the generation of bad alignment. By using the method of the present invention, it is possible to increase the thickness of the wiring, thereby increasing the yield of manufacturing.

Form the foregoing, it will be understood that the present invention provides an active matrix liquid crystal display element with high quality at high manufacturing yield without bad alignment. Further, it is possible to solve the problem of wiring resistance for the large display.

I claim:
1. A method of aligning liquid crystal molecules in an active matrix liquid crystal display element having an active substrate provided with a switching element at each pixel for driving the picture element, an opposite substrate provided opposite to the active substrate, and a liquid crystal layer having molecules sealed between the substrates comprising the steps of aligning the liquid crystal molecules at the active substrate by main alignment in a main alignment direction and supplementary alignment in a supplementary alignment direction, both alignments being across the whole substrate, wherein the supplementary alignment direction is determined so as to reduce the area of untreated portions at each pixel, by treating those portions which are not treated by the main alignment because of a projection of the switching element;

aligning the liquid crystal molecules at the opposite substrate in at least one direction which is different from the main alignment direction.

2. The method according to claim 1 wherein said main alignment at said active substrate and said aligning at said opposite substrate are performed in directions for establishing a desired preferential viewing direction of the display, and said supplementary alignment is performed in a direction parallel to or at a right angle to data electrodes or scanning electrodes provided on said active substrate.

3. The method according to claim 1 wherein said main alignment at said active substrate and said aligning at said opposite substrate are performed in directions for establishing a desired preferential viewing direction of the display, and said supplementary alignment is performed in substantially the same direction as a direction of molecules in a central portion of said liquid crystal layer.

* * * * *